US009674723B2

(12) United States Patent
Siomina et al.

(10) Patent No.: US 9,674,723 B2
(45) Date of Patent: Jun. 6, 2017

(54) SYSTEMS AND METHODS FOR MAINTAINING TIME STAMPING ACCURACY TO MEET A NON-LINEAR TIME DRIFT CONSTRAINT

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolagent L M Ericsson (publ), Stockholm (SE)

( * ) Notice: Subject to any disclaimer, the term of this patent is extended or adjusted under 35 U.S.C. 154(b) by 201 days.

(21) Appl. No.: 14/070,758

(22) Filed: Nov. 4, 2013

(65) Prior Publication Data
US 2014/0126472 A1 May 8, 2014

Related U.S. Application Data

(60) Provisional application No. 61/722,628, filed on Nov. 5, 2012.

(51) Int. Cl.
*H04W 24/04* (2009.01)
*H04W 24/10* (2009.01)
(Continued)

(52) U.S. Cl.
CPC ........... *H04W 24/10* (2013.01); *H04J 3/0685* (2013.01); *H04W 24/02* (2013.01); *H04W 52/0287* (2013.01); *H04W 56/00* (2013.01)

(58) Field of Classification Search
CPC ..... H04W 24/10; H04W 24/08; H04W 16/18; H04W 24/06; H04J 3/0685; H04L 12/2697; G04G 7/00
(Continued)

(56) References Cited

U.S. PATENT DOCUMENTS 6,292,748 B1 * 9/2001 Harrison ........................ 701/478
6,600,919 B1    7/2003 Kawase
(Continued)

FOREIGN PATENT DOCUMENTS

| CA | 2669041 A1 | 12/2010 |
| WO | 2012047070 A2 | 4/2012 |
| WO | 2012060765 A1 | 5/2012 |

OTHER PUBLICATIONS

3GPP TS37.320 V11.1.0 (Sep. 2012), Radio Measurement collection for minimization of Drive Tests (MDT).*
(Continued)

*Primary Examiner* — Kamran Afshar
*Assistant Examiner* — Ather Mohiuddin
(74) *Attorney, Agent, or Firm* — R. Chad Bevins

(57) ABSTRACT

Systems and methods for maintaining time stamping accuracy are disclosed. In one embodiment, a wireless device in a cellular communications network logs data to provide a log. The wireless device maintains an accuracy of time stamping for the log to meet, or satisfy, a non-linear time drift constraint. In one embodiment, the log is one or more of a Radio Resource Control (RRC) connection establishment failure log, a radio link failure log, a random access failure log, a paging channel failure log, a broadcast channel failure log, data related to failure of one or more specific channels, and a radio measurement. In another embodiment, the log is a Minimization of Drive Tests (MDT) log.

24 Claims, 14 Drawing Sheets

(51) Int. Cl.
　　　*H04J 3/06*　　　(2006.01)
　　　*H04W 24/02*　　(2009.01)
　　　*H04W 52/02*　　(2009.01)
　　　*H04W 56/00*　　(2009.01)
(58) Field of Classification Search
　　　USPC .................. 455/423, 450, 502, 509, 67.11
　　　See application file for complete search history.

(56) References Cited

U.S. PATENT DOCUMENTS

| | | | |
|---|---|---|---|
| 2003/0016770 A1* | 1/2003 | Trans ...................... | H04B 1/00 375/346 |
| 2005/0289453 A1* | 12/2005 | Segal ...................... | G06F 1/12 715/203 |
| 2006/0279628 A1* | 12/2006 | Fleming ............... | G11B 27/034 348/143 |
| 2010/0188255 A1* | 7/2010 | Cornwall ............... | G01D 4/004 340/870.02 |
| 2010/0331013 A1* | 12/2010 | Zhang .................. | G01S 5/0242 455/456.2 |
| 2011/0194441 A1 | 8/2011 | Jung et al. | |
| 2011/0269402 A1 | 11/2011 | Yi et al. | |
| 2011/0287793 A1 | 11/2011 | Tenny et al. | |
| 2012/0040621 A1 | 2/2012 | Jung et al. | |
| 2012/0106356 A1 | 5/2012 | Johansson et al. | |
| 2012/0113837 A1* | 5/2012 | Siomina ................ | H04W 24/10 370/252 |
| 2012/0282916 A1 | 11/2012 | Futaki et al. | |
| 2012/0311136 A1* | 12/2012 | Shafi ..................... | H04W 56/00 709/224 |
| 2013/0005356 A1 | 1/2013 | Kobayashi | |
| 2013/0109320 A1 | 5/2013 | Tomala et al. | |
| 2013/0121204 A1 | 5/2013 | Lee et al. | |
| 2013/0272139 A1 | 10/2013 | Guo et al. | |
| 2013/0326224 A1* | 12/2013 | Yavuz .................. | H04L 9/3247 713/176 |
| 2014/0051428 A1 | 2/2014 | Jung et al. | |
| 2014/0128057 A1 | 5/2014 | Siomina et al. | |
| 2014/0213194 A1 | 7/2014 | Feng et al. | |
| 2014/0295847 A1 | 10/2014 | Futaki | |

OTHER PUBLICATIONS

Time-based Location Techniques Using Inexpensive, Unsynchronized Clocks in 802.11 Matthew Mah Ashok Agrawala University of Maryland, College Park Mar. 25, 2010.*
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.1.0, 3GPP Organizational Partners, Sep. 2012, 325 pages.
Author Unknown, "Technical Specification Group Radio Access Network; Evolved Universal Terrestrial Radio Access (E-UTRA); Requirements for support of radio resource management (Release 10)," Technical Specification 36.133, Version 10.8.1, 3GPP Organizational Partners, Sep. 2012, 667 pages.
Author Unknown, "Technical Specification Group Radio Access Network; Evolved Universal Terrestrial Radio Access (E-UTRA); Requirements for support of radio resource management (Release 11)," Technical Specification 36.133, Version 11.2.0, 3GPP Organizational Partners, Sep. 2012, 672 pages.
Author Unknown, "Technical Specification Group Radio Access Network; Requirements for support of radio resource management (FDD) (Release 11)," Technical Specification 25.133, Version 11.2.0, 3GPP Organizational Partners, Sep. 2012, 277 pages.
Author Unknown, "Technical Specification Group Radio Access Network; Requirements for support of radio resource management (TDD) (Release 11)," Technical Specification 25.123, Version 11.0.0, 3GPP Organizational Partners, Jun. 2012, 453 pages.
Author Unknown, "Technical Specification Group Services and System Aspects; Telecommunication management; Subscriber and equipment trace; Trace concepts and requirements (Release 11)," Technical Specification 32.421, Version 11.4.0, 3GPP Organizational Partners, Sep. 2012, 37 pages.
Author Unknown, "Technical Specification Group Services and System Aspects; Telecommunication management; Subscriber and equipment trace; Trace control and configuration management (Release 11)," Technical Specification 32.422, Version 11.5.0, 3GPP Organizational Partners, Sep. 2012, 124 pages.
Author Unknown, "Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Technical Specification 37.320, Version 1.0.0, 3GPP Organizational Partners, Aug. 2010, 14 pages.
Ericsson, ST-Ericsson, "R4-126679: On MDT requirements in Rel-11," 3rd Generation Partnership Project (3GPP), TSG-RAN WG4 Meeting #65, Nov. 12-16, 2012, 3 pages, New Orleans, Louisiana.
Griffith, Danielle et al., "A 65nm CMOS DCXO System for Generating 38.4MHz and a Real Time Clock from a Single Crystal in 0.09 mm2," 2010 IEEE Radio Frequency Integrated Circuits Symposium, May 23-25, 2010, Anaheim, California, pp. 321-324.
Huawei, Hisilicon, "R4-112059: Further discussion on relative time stamp accuracy for MDT," 3rd Generation Partnership Project (3GPP), TSG-RAN WG4 Meeting #58AH, Apr. 11-15, 2011, 2 pages, Shanghai, China.
Miyayama, T. et al., "A New Digitally Temperature Compensated Crystal Oscillator for a Mobile Telephone System," Proceedings of the 42nd Annual Frequency Control Symposium, Jun. 1-3, 1988, Baltimore, Maryland, pp. 327-333.
Schmid, Thomas et al., "Exploiting Manufacturing Variations for Compensating Environment-induced Clock Drift in Time Synchronization," Proceedings of the 2008 ACM SIGMETRICS International Conference on Measurement and Modeling of Computer Systems, vol. 36, No. 1, Jun. 2-6, 2008, Annapolis, Maryland, 12 pages.
NTT Docomo, "R4-110616: Clarifications of time stamp accuracy for MDT," 3rd Generation Partnership Project (3GPP), TSG-RAN WG4 meeting #58, Feb. 21-25, 2011, 3 pages, Taipei, Taiwan.
International Search Report and Written Opinion for PCT/IB2013/059911 mailed Jan. 28, 2014, 13 pages.
International Search Report and Written Opinion for PCT/IB2013/059917 mailed Feb. 25, 2014, 13 pages.
Author Unknown, "Technical Specification Group Core Network and Terminals; Non-Access-Stratum (NAS) protocol for Evolved Packet System (EPS); Stage 3 (Release 11)," Technical Specification 24.301, Version 11.4.0, 3GPP Organizational Partners, Sep. 2012, 341 pages.
Author Unknown, "Technical Specification Group Radio Access Network; Radio Resource Control (RRC); Protocol specification (Release 11)," Technical Specification 25.331, Version 11.3.0, 3GPP Organizational Partners, Sep. 2012, 1981 pages.
Author Unknown, "Technical Specification Group Radio Access Network; Study on Minimization of drive-tests in Next Generation Networks (Release 9)," Technical Report 36.805, Version 9.0.0, 3GPP Organizational Partners, Dec. 2009, 24 pages.
Author Unknown, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall Description; Stage 2 (Release 11)," Technical Specification 37.320, Version 11.1.0, 3GPP Organizational Partners, Sep. 2012, 21 pages.
Office Action for Mexican Patent Application No. MX/A/2015/005613, mailed Apr. 20, 2016, 4 pages.
Non-Final Office Action for U.S. Appl. No. 14/070,755, mailed May 22, 2015, 10 pages.
Office Action for Mexican Patent Application No. MX/a/2015/005613, mailed Aug. 9, 2016, 6 pages.
Non-Final Office Action for U.S. Appl. No. 14/070,755, mailed Dec. 4, 2015, 9 pages.

(56) References Cited

OTHER PUBLICATIONS

Non-Final Office Action for U.S. Appl. No. 14/070,755, mailed Jun. 17, 2016, 14 pages.
Final Office Action and Applicant-Initiated Interview Summary for U.S. Appl. No. 14/070,755, mailed Jan. 6, 2017, 14 pages.

* cited by examiner

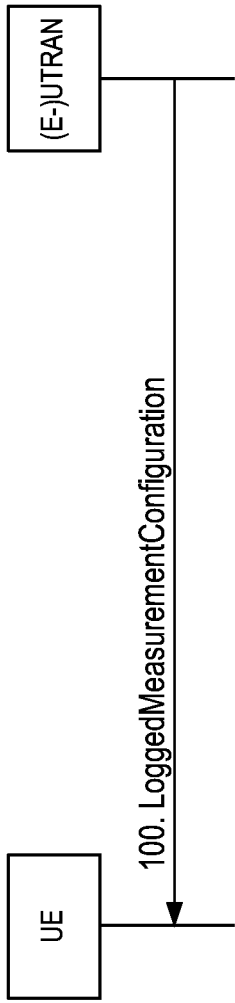

FIG. 1

```
LoggedMeasurementConfiguration-r10-IEs ::= SEQUENCE {
    traceReference-r10              TraceReference-r10,
    traceRecordingSessionRef-r10    OCTET STRING (SIZE (2)),
    tce-Id-r10                      OCTET STRING (SIZE (1)),
    absoluteTimeInfo-r10            AbsoluteTimeInfo-r10,
    areaConfiguration-r10           AreaConfiguration-r10           OPTIONAL,   --Need OR
    loggingDuration-r10             LoggingDuration-r10,
    loggingInterval-r10             LoggingInterval-r10,
    nonCriticalExtension            LoggedMeasurementConfiguration-v11x0-IEs    OPTIONAL
}

LoggedMeasurementConfiguration-v11x0-IEs ::= SEQUENCE {
    lateNonCriticalExtension        OCTET STRING                    OPTIONAL,   --Need OP
    plmn-IdentityList-r11           PLMN-IdentityList3-r11          OPTIONAL,   --Need OP
    areaConfiguration-v11x0         AreaConfiguration-v11x0         OPTIONAL,   --Need OR
    nonCriticalExtension            SEQUENCE {}                     OPTIONAL    --Need OP
}
```

FIG. 2

VarConnEstFail-Report

The UE variable VarConnEstFail-Report includes the connection establishment failure information.

VarConnEstFail-Report UE variable

```
-- ASN1START

VarConnEstFail-Report-r11 ::=       SEQUENCE {
    connEstFailReport-r11               ConnEstFailReport-r11,
    plmn-Identity-r11                   PLMN-Identity
}

--ASN1STOP

ConnEstFailReport-r11 ::=   SEQUENCE {
    failedCellId-r11            CellGlobalIdEUTRA,
    locationInfo-r11            LocationInfo-r10                            OPTIONAL,
    measResultFailedCell-r11    SEQUENCE {
        rsrpResult-r11              RSRP-Range,
        rsrqResult-r11              RSRQ-Range
    },
    measResultNeighCells-r11    SEQUENCE {
        measResultList2EUTRA-r11    MeasResultList2EUTRA-r9                 OPTIONAL,
        measResultListUTRA-r11      MeasResultList2UTRA-r9                  OPTIONAL,
        measResultListGERAN-r11     MeasResultListGERAN                     OPTIONAL,
        measResultsCDMA2000-r11     MeasResultList2CDMA2000-r9              OPTIONAL
    }                                                                       OPTIONAL,
    numberOfPreamblesSent-r11   INTEGER (1..200),
    contentionDetected-r11      BOOLEAN,
    maxTxPowerReached-r11       BOOLEAN,
    timeSinceFailure-r11        INTEGER (0..172800)                         OPTIONAL,
    ...
}
```

*FIG. 5*

SYSTEMS AND METHODS FOR MAINTAINING TIME STAMPING ACCURACY TO MEET A NON-LINEAR TIME DRIFT CONSTRAINT

RELATED APPLICATIONS

This application claims the benefit of provisional patent application Ser. No. 61/722,628, filed Nov. 5, 2012, the disclosure of which is hereby incorporated herein by reference in its entirety.

This application is related to U.S. patent application Ser. No. 14/070,755, entitled SYSTEMS AND METHODS FOR CONTROLLING LOGGING AND REPORTING UNDER CONSTRAINTS, filed Nov. 4, 2013, which is commonly owned and assigned and is hereby incorporated herein by reference in its entirety.

FIELD OF THE DISCLOSURE

The present disclosure relates to logging and reporting data in a wireless communications network and, more specifically, to maintaining time stamping accuracy for logging and reporting of data in a wireless communications network.

BACKGROUND

Non-real time measurements and background services are becoming more and more common in cellular communications networks. More and more information is being exchanged between the cellular communications network and wireless devices in the cellular communications network for various purposes, e.g., file sharing, measurements reporting for Minimization of Drive Tests (MDT), etc. Deploying radio nodes that provide a specific service or a restricted set of services becomes more justified in such wireless network architectures. Third Generation Partnership Project (3GPP) standards, however, provide limited possibilities for using such specialized service nodes, and in particular provide limited possibilities for specialized service nodes facilitating non-real time information collection throughout the cellular communications network. To enable full functionality, such specialized service nodes would have to, at a minimum, announce their presence and availability and, in one way or another, indicate the service(s) being provided by the specialized service node.

One example application of collecting non-real time measurements is MDT and enhanced MDT, which is being standardized for Universal Mobile Telecommunications System (UMTS) and Long Term Evolution (LTE). MDT is used as a means to compensate or partially replace costly drive tests an operator will otherwise have to perform by configuring a selection of User Equipment devices (UEs) in active or idle mode to do certain types of measurements, as specified in 3GPP Technical Report (TR) 36.805 ("Evolved Universal Terrestrial Radio Access (E-UTRA); Study on minimization of drive-tests in next generation networks") and 3GPP TR 37.320 ("Radio measurement collection for Minimization of Drive Tests (MDT)"). The selection can be made based on International Mobile Subscriber Identity (IMSI), International Mobile Equipment Identity (IMEI), area, device capabilities, and any combinations thereof.

So far, the following use cases for MDT have been identified:
Coverage optimization,
Mobility optimization,
Capacity optimization,
Parameterization for common channels, and
Quality of Service (QoS) verification.

Two modes of MDT exist, immediate MDT and logged MDT. Immediate MDT is the MDT functionality involving measurement performance by a UE in a high Radio Resource Control (RRC) activity state (e.g., RRC CONNECTED state in LTE, CELL_DCH state in Universal Terrestrial Radio Access (UTRA) Frequency Division Duplexing (FDD) and UTRA Time Division Duplexing (TDD), etc.) and reporting of the measurements to a network node (e.g., an Evolved Node B (eNB), a Radio Network Controller (RNC), a Node B (NB), a Base Station Controller (BSC), a Base Station (BS), a relay, etc.) available at the time of the occurrence of a reporting condition. Logged MDT is the MDT functionality involving measurement performance by a UE when operating in a low RRC activity state (e.g., RRC_IDLE in LTE and idle mode, CELL_PCH, URA_PCH or CELL_FACH states in UTRA FDD or UTRA TDD, etc.). The logging in a low activity state is carried out by the UE at points when configured conditions are satisfied. The measurement log is stored for reporting of measurements to a network node (e.g., eNB, Radio Network Controller (RNC) Node B (NB), BSC, BS, relay, etc.) at a later point in time.

One possible requirement for MDT in particular implementations is that the measurements in measurement logs and the reported measurements for immediate MDT are linked to available location information and/or other information or measurements that can be used to derive location information (e.g., Reference Signal Received Power (RSRP) measurements may be selected for this purpose in some implementations). The measurements in the measurement logs are also linked to a time stamp that is available in the UE.

In various implementations, the following measurements logs (or suitable alternatives) may be utilized:
Periodical downlink pilot measurements,
Serving cell becomes worse than threshold,
Transmit power headroom becomes less than threshold,
Random access failure,
Paging channel failure,
Broadcast channel failure, and
Radio link failure report.

In addition to the information which may be specific for the type of the log, all of the measurement logs listed above include at least the following:
Location information when available (e.g., the location at which the concerned trigger and/or measurement took place),
Time information (e.g., the time at which the concerned trigger and/or measurement took place),
Cell identification (at least the serving cell is always included), and
Radio environment measurement (e.g., cell measurements that are available at the trigger for the logged measurement and/or average cell measurements during a certain period before/after the trigger for the logged measurement, where the cell measurements include RSRP and Reference Signal Received Quality (RSRQ) measurements).

Signaling of MDT measurements and logs, including the associated location information, is via RRC signaling. For logged MDT, the configuration, measurement collection, and reporting of the concerned measurements will always be done in cells of the same Radio Access Technology (RAT) type. There is only one RAT-specific logged measurement configuration for logged MDT in the UE, and it is left up to the cellular communications network to retrieve any relevant data before providing a new configuration (e.g. for another RAT) since the previous log may be cleared.

When a logging area is configured, logged MDT measurements are performed as long as the UE is within this logging area. When the UE is not in the logging area or a Registered Public Land Mobile Network (PLMN) (RPLMN) of the UE is not part of an MDT PLMN list, logging is suspended, i.e. the logged measurement configuration and the log are kept (until a logging duration timer expires), but measurement results are not logged and the logging duration timer continues. In case a new PLMN that does not belong to the MDT PLMN list provides a logged measurement configuration, any previous logged measurement configuration and the corresponding log are cleared and overwritten without being retrieved by the cellular communications network.

Logged MDT measurements are configured with an MDT Measurement Configuration procedure, which is illustrated in FIG. 1. As shown, the cellular communications network, specifically the Radio Access Network (RAN) (i.e., the Universal Terrestrial Radio Access Network (UTRAN) or Evolved Universal Terrestrial Radio Access Network (E-UTRAN)), initiates the procedure to a UE in RRC Connected state by sending a LoggedMeasurementConfiguration message to the UE (step 100). The LoggedMeasurementConfiguration message is sent in the Downlink (DL) Dedicated Control Channel (DCCH) Message class, which is a set of RRC messages that may be sent from the E-UTRAN to the UE or from the E-UTRAN to the relay node on the DL DCCH logical channel. The LoggedMeasurementConfiguration message is used to transfer configuration parameters for logged MDT. A release operation for logged measurement configuration in the UE is realized only by replacing the logged measurement configuration with a new configuration (i.e., when the logged measurement configuration is overwritten) or by clearing the logged measurement configuration when a duration timer has expired or an expiration condition is met. The format of the LoggedMeasurementConfiguration message is illustrated in FIG. 2.

At the UE, upon receiving the LoggedMeasurementConfiguration message, the UE starts a timer T330 with the timer value set to a LoggingDuration specified in the LoggedMeasurementConfiguration message. Upon expiry of the timer T330 or when memory reserved for the logged measurement information becomes full (which triggers T330 expiry), the UE is allowed to discard VarLogMeasConfig. VarLogMeasConfig is defined in 3GPP Technical Specification (TS) 36.331 as the UE variable that includes the configuration of the logging of measurements to be performed by the UE while in RRC_IDLE, covering intra-frequency, inter-frequency, and inter-RAT mobility related measurements. The variable VarLogMeasConfig is signaled to the UE by the network node in an RRC message. Forty-eight (48) hours after expiry of the timer T330, the UE is also allowed to discard the stored logged measurements and VarLogMeasReport. VarLogMeasReport is also defined in 3GPP TS 36.331 as the UE variable that includes the logged measurements information. The UE variable VarLogMeasReport is also signaled to the UE by the network node in an RRC message.

Within the LoggedMeasurementConfiguration message, Logging Duration defines an amount of time that measurements are to be logged after the UE receives the LoggedMeasurementConfiguration message. Logging Duration is one of the predefined values in the range of 10 minutes to 120 minutes. LoggingInterval is an interval of measurement logging and is one of the predefined values in the range of 1.28 seconds to 2.56 seconds. The Trace Collection Entity (TCE) Identifier (ID), tce-Id, denotes a particular TCE. The UE returns the tce-Id to the cellular communications network together with the logged data. The cellular communications network has a configured mapping of an Internet Protocol (IP) address of the TCE (to which corresponding trace records are transferred) and the TCE ID. The mapping needs to be unique within the PLMN.

If areaConfiguration is configured, the UE will log measurements as long as the UE is within the configured logging area. The scope of the logging area may consist of one of a list of 32 global cell identities. If this list is configured, the UE will only log measurements when camping in any of these cells. Alternatively, the logging area may consist of a list of eight Tracking Areas (TAs), eight Local Areas (LAs), or eight Registered Areas (RAs). If this list is configured, the UE will only log measurements when camping in any cell belonging to the preconfigured TA/LA/RAs. If no logging area is configured, the logged measurement configuration is valid in the entire MDT PLMN of the UE, i.e. the UE will log measurements throughout the MDT PLMN.

FIG. 3 illustrates an example of logged MDT reporting as described in 3GPP TS 32.421, "Telecommunication management; Subscriber and equipment trace; Trace concepts and requirements," V11.4.0, September 2012 and 3GPP TS 32.422, "Telecommunication management; Subscriber and equipment trace; Trace control and configuration management," V11.5.0, September 2012, both of which are incorporated herein by reference herein their entireties. In case of logged MDT, the UE collects the measurements while it is in IDLE mode. As illustrated, MDT is configured as discussed above (step 200). The UE enters the IDLE mode (step 202). While in the IDLE mode, the UE performs MDT measurement logging (step 204). Sometime after measurement logging is complete (i.e., after the logging duration has expired), the UE enters the RRC CONNECTED mode (step 206), and the UE indicates MDT log availability in an RRCConnectionSetupComplete message sent to the RNC/eNB (step 208). The UE will not indicate MDT log availability in another RAT or in another RPLMN.

When the RNC/eNB receives the indication of the MDT log availability, the RNC/eNB can request the MDT log (if the UE is still in the same RAT type where the MDT configuration was done) by sending a UEInformationRequest message to the UE (step 210). The MDT log is then sent to the RNC/eNB in a UEInformationResponse message (step 212). The reporting may occur in different cells than which the logged measurement configuration is signaled. At the reception of the UEInformationResponse message, the RNC/eNB saves the received MDT log to a trace record (step 214) and sends the trace record to the corresponding TCE (step 216).

The reported MDT log consists of measurement results for the serving cell of the UE (the measurement quantity), available UE measurements performed in IDLE mode for intra-frequency/inter-frequency/inter-RAT, time stamps, and location information. The number of neighboring cells to be logged is limited by a fixed upper limit per frequency for each category (e.g., six for intra-frequency neighboring cells, three for inter-frequency neighboring cells, etc.). The measurement reports for neighboring cells (which are part of the same MDT log/report as the measurements for the serving cell but contained in different Information Elements (IEs)) consist of: Physical Cell Identity (PCI) of the logged cell, carrier frequency, RSRP and RSRQ for E-UTRA, Received Signal Code Power (RSCP) and Energy per Chip (Ec)/Noise Spectral Density (No) for UTRA, Primary Common Control Physical Channel (P-CCPCH) RSCP for UTRA 1.28 TDD, Received Signal Level (Rxlev) for Global System for Mobile Communications Edge Radio Access Network (GERAN), and Pilot Pseudo noise (Pn) Phase and Pilot Strength for Code Division Multiple Access (CDMA) 2000.

In case of immediate MDT, as illustrated in FIG. 4, the MDT is first configured as discussed above (step 300). For immediate MDT, the UE is in RRC CONNECTED mode. The UE periodically logs MDT measurements and reports the logged MDT measurements to the RNC/eNB via RRC signaling (as part of existing RRC measurements) where the logged MDT measurements are stored to a trace record (steps 302 through 312). The immediate MDT measurement reports are periodic (with intervals in the range of 120 milliseconds (ms) to 1 hour) or event-triggered. The trace records are sent to the TCE via an Element Manager (EM), where the EM can reside in the RNC/eNB (steps 314 and 316).

In addition to MDT logs, the UE logs failed RRC connection establishments for LTE and UMTS, i.e. a log is created when the RRC connection establishment procedure fails. For LTE, the trigger for creating a log related to a failed RRC connection establishment is when timer T300 expires. For UMTS, the trigger for creating a log related to a failed RRC connection establishment is when V300 is greater than N300. Unlike logged MDT and immediate MDT, the UE logs failed RRC connection establishments without the need for prior configuration by the cellular communications network.

For an RRC connection establishment failure log, the UE stores the selected PLMN on the RRC connection establishment failure. The UE may report the RRC connection establishment failure log only if that PLMN is the same as the RPLMN. The RRC connection establishment failure log includes:
  Time stamp, which is the elapsed time between logging and reporting the log,
  The global cell identity of the serving cell when the RRC connection establishment fails, i.e. the cell which the UE attempted to access,
  The latest available radio measurements for any frequency or RAT,
  The latest detailed location information, if available,
  For LTE:
    Number of random access preambles transmitted,
    Indication whether the maximum transmission power was used, and
    Contention detected,
  For UMTS FDD:
    Number of RRC Connection Request attempts (e.g., T300 expiry after receiving an Acknowledgement (ACK) and an Acquisition Indicator Channel (AICH)),
    Indication of probable contention, e.g. mismatch of UE identity in RRC CONNECTION SETUP message, and
  For UMTS TDD:
    Number of RRC connection request attempts,
    Indication of probable contention, e.g. mismatch of UE identity in RRC CONNECTION SETUP message,
    Whether the Fast Physical Access Channel (FPACH) is received or whether the maximum number Mmax of synchronization attempts is reached, and
    Failure indication of the Enhanced Dedicated Channel Random Access Uplink Control Channel (E-RUCCH) transmission. The failure indication is only applied if common Enhanced Dedicated Channel (E-DCH) is supported by the UE and the cellular communications network.

With regard to RRC connection establishment failure logging in LTE, the content of the report is illustrated in FIG. 5. The information for the RRC connection establishment failure log is logged at expiry of timer T300, which is initiated when the UE sends an RRCConnectionRequest. The timer T300 is stopped when the UE receives an RRCConnectionSetup or RRCConnectionReject message, when there is cell re-selection, or upon abortion of connection establishment by upper layers. The timer T300 is defined in 3GPP TS 36.331 as follows:

| Timer | Start | Stop | At expiry |
| --- | --- | --- | --- |
| T300 | Transmission of RRCConnectionRequest | Reception of RRCConnectionSetup or RRCConnectionReject message, cell re-selection, and upon abortion of connection establishment by upper layers | Perform the actions as specified in 5.3.3.6 |

The availability of the RRC connection establishment failure report (the connEstFailInfoAvailable indication) may be indicated upon reception by the UE of the following messages:
  RRCConnectionSetup,
  RRCConnectionReconfiguration including the mobilityControlInfo (handover), and
  RRCConnectionReestablishment.

The time stamping for the RRC connection establishment failure report is upon receiving a UEInformationRequest message when the report is available. The UEInformationRequest message may be sent to the UE when the availability of the report (by the indicator connEstFailInfoAvailable) has been indicated by the UE. The UE then includes the available report in a UEInformationResponse message. Specifically, upon receiving the UEInformationRequest message, the UE will:
  If connEstFail-ReportReq is set to true and the UE has connection establishment failure information in VarConnEstFail-Report and if the RPLMN is equal to plmn-Identity stored in VarConnEstFail-Report:
    Set timeSinceFailure in VarConnEstFail-Report to the time that elapsed since the last connection establishment failure; and
    Set the connEstFail-Report in the UEInformationResponse message to the value of connEstFail-Report in VarConnEstFail-Report.

In UTRA, the logging of an RRC connection establishment failure depends on timer V300. Namely, when V300 is greater than N300, the UE performs the following actions for logging of a failed RRC connection establishment (as specified in 3GPP TS 25.311, section 8.1.3.11):
  If the RRC connection establishment fails, the UE shall perform logging of information for later retrieval. The UE shall store connection establishment failure information in the variable LOGGED_CONNECTION_ESTABLISHMENT_FAILURE by setting its respective fields to corresponding values.

From the above, it becomes evident that there is a substantial difference between time stamping for RRC connection establishment failure log reporting and time stamping for MDT measurement logs in RRC IDLE mode. This difference is schematically illustrated in FIG. 6. As shown, the major difference is that the time stamp for the RRC connection establishment failure log my occur after up to 48 hours after a reference time (failure logged), while the maximum time for maximum time for the logged MDT measurements to be logged and time-stamped is two hours with respect to a reference time (MDT configuration received).

Current MDT logging and reporting mechanisms as well as current RRC connection establishment failure logging and reporting mechanisms have a number of problems. As such, there is a need for systems and methods for enhanced MDT logging and/or reporting as well as enhanced RRC connection establishment failure logging and/or reporting.

SUMMARY

Systems and methods for maintaining time stamping accuracy are disclosed. In one embodiment, a wireless device in a cellular communications network logs data to provide a log. The wireless device maintains an accuracy of time stamping for the log to meet, or satisfy, a non-linear time drift constraint. In one embodiment, the log is one or more of a Radio Resource Control (RRC) connection establishment failure log, a radio link failure log, a random access failure log, a paging channel failure log, a broadcast channel failure log, data related to failure of one or more specific channels, and a radio measurement. In another embodiment, the log is a Minimization of Drive Tests (MDT) log.

In one embodiment, the non-linear time drift constraint includes a linear time drift constraint and a total maximum time drift over a defined amount of time, wherein the total maximum time drift over the defined amount of time is less than an amount of time drift in the time stamping that would result from the linear time drift constraint over the defined amount of time. In this manner, the total maximum time drift is more restrictive than the linear time drift constraint such that the combination of the total maximum time drift and the linear time drift constraint provide the non-linear time drift constraint.

In one embodiment, the non-linear time drift constraint is a constraint that a time drift of the time stamping for the log is not larger than ±X seconds per hour and ±Y seconds over a defined amount of time. In one embodiment, the defined amount of time is 48 hours. In another embodiment, X is 0.72 and the defined amount of time is 48 hours. In yet another embodiment, X is 0.72, the defined amount of time is 48 hours, and Y is less than 34.56 (i.e., less than 0.72×48).

In one embodiment, the wireless device maintains the accuracy of the time stamping for the log by switching between two or more clocks having different accuracies such that the non-linear time drift constraint is met.

In another embodiment, the wireless device maintains the accuracy of the time stamping for the log by adaptively adjusting one or more clocks utilized for the time stamping for the log based on a reference time to meet the non-linear time drift constraint.

In another embodiment, the wireless device maintains the accuracy of the time stamping for the log by adaptively synchronizing one or more clocks utilized for the time stamping for the log to a reference time to meet the non-linear time drift constraint.

In yet another embodiment, the wireless device maintains the accuracy of the time stamping for the log by adaptively controlling an activity state of the wireless device to meet the non-linear time drift constraint.

In one embodiment, the time stamping for the log is one or more of: a relative time stamp for a logged measurement as a time from a moment an MDT configuration was received at the wireless device until the logged measurement was logged, a relative time stamp as a time elapsed between a moment the logged data is logged and a moment the logged data is reported, a relative time stamp as a time elapsed between a moment the logged data is logged and a moment the logged data is included in a report to be reported, and a relative time stamp for an RRC connection establishment failure as a time elapsed from a last RRC connection establishment failure to a time when the log is included in a report.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a conventional Minimization of Drive Tests (MDT) configuration procedure;

FIG. 2 illustrates the format of a conventional Logged-MeasurementConfiguration message used for MDT configuration;

FIG. 5 illustrates the content of a Radio Resource Control (RRC) connection establishment failure log as defined in 3GPP standards;

Figure 3:
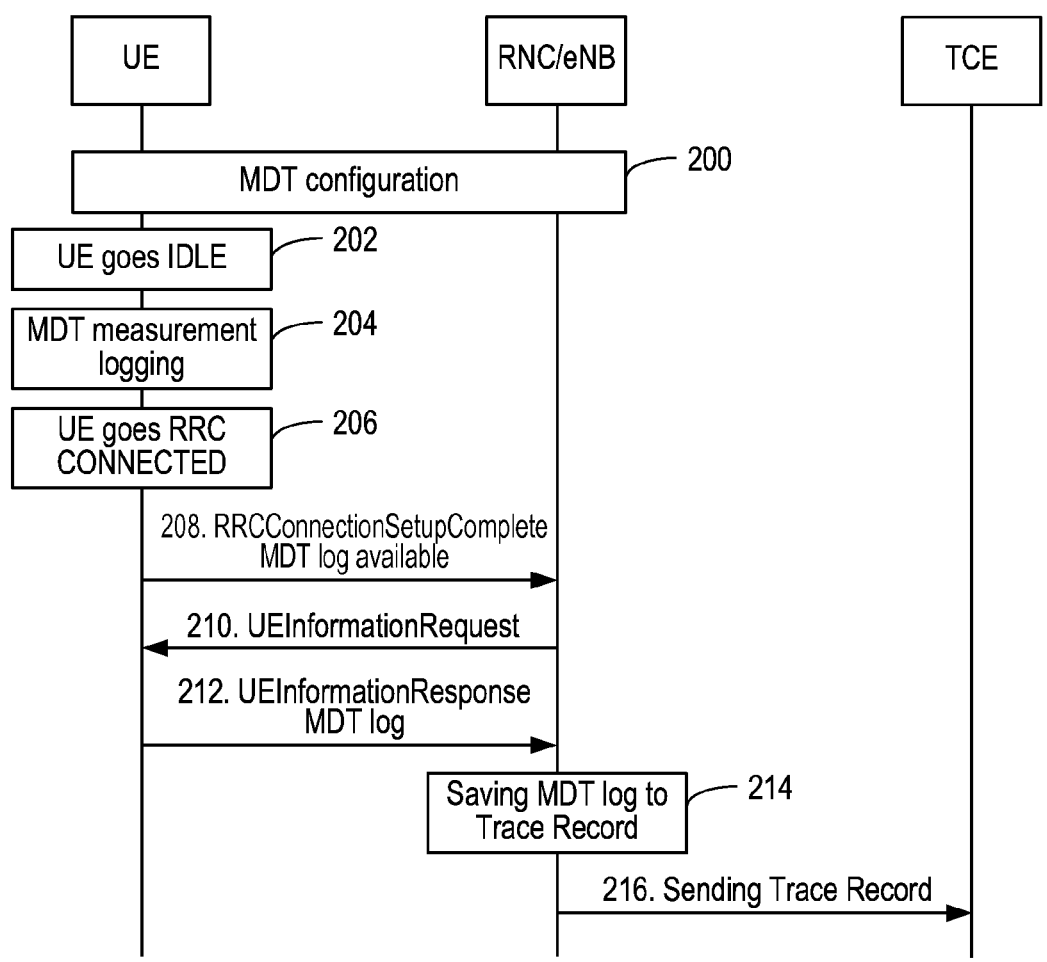
FIG. 3 illustrates an example of logged MDT reporting as described in $3^{rd}$ Generation Partnership Project (3GPP) standards.
Figure 4:
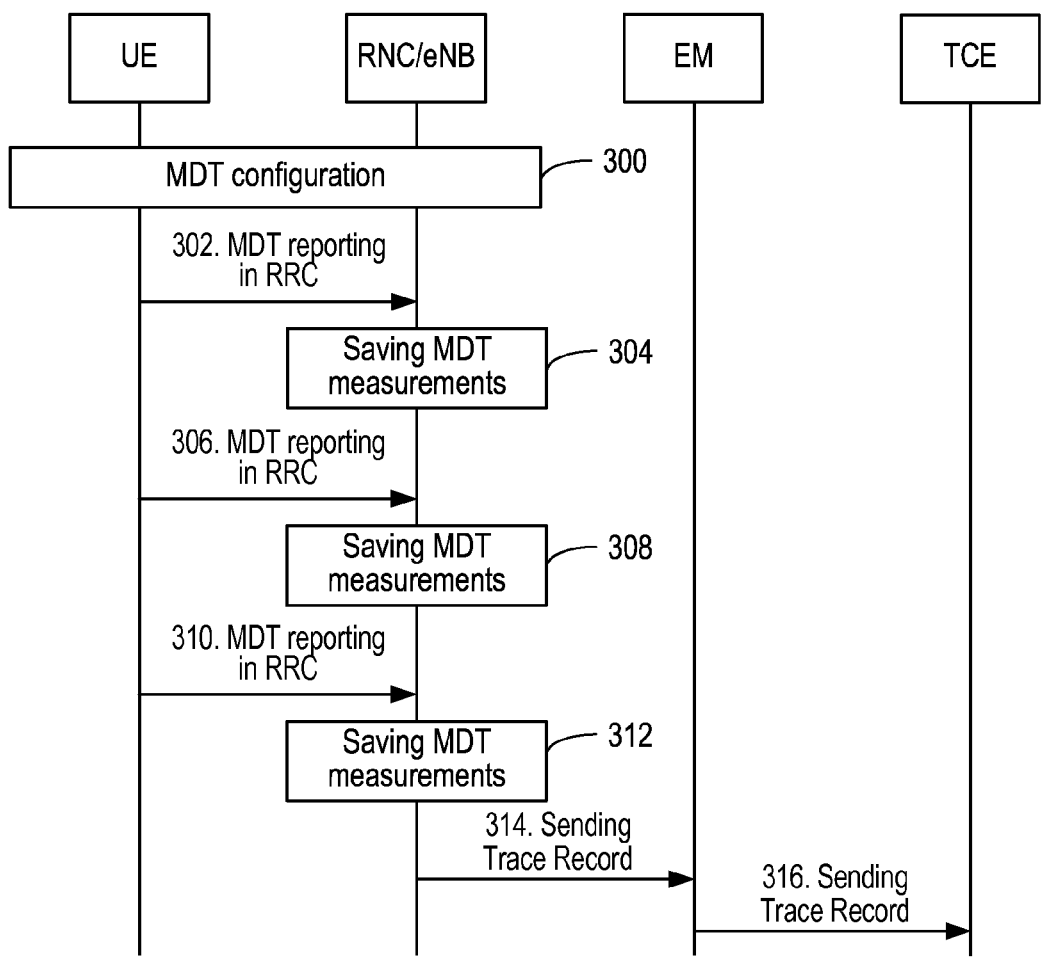
FIG. 4 illustrates an example of immediate MDT reporting.
Figure 6:
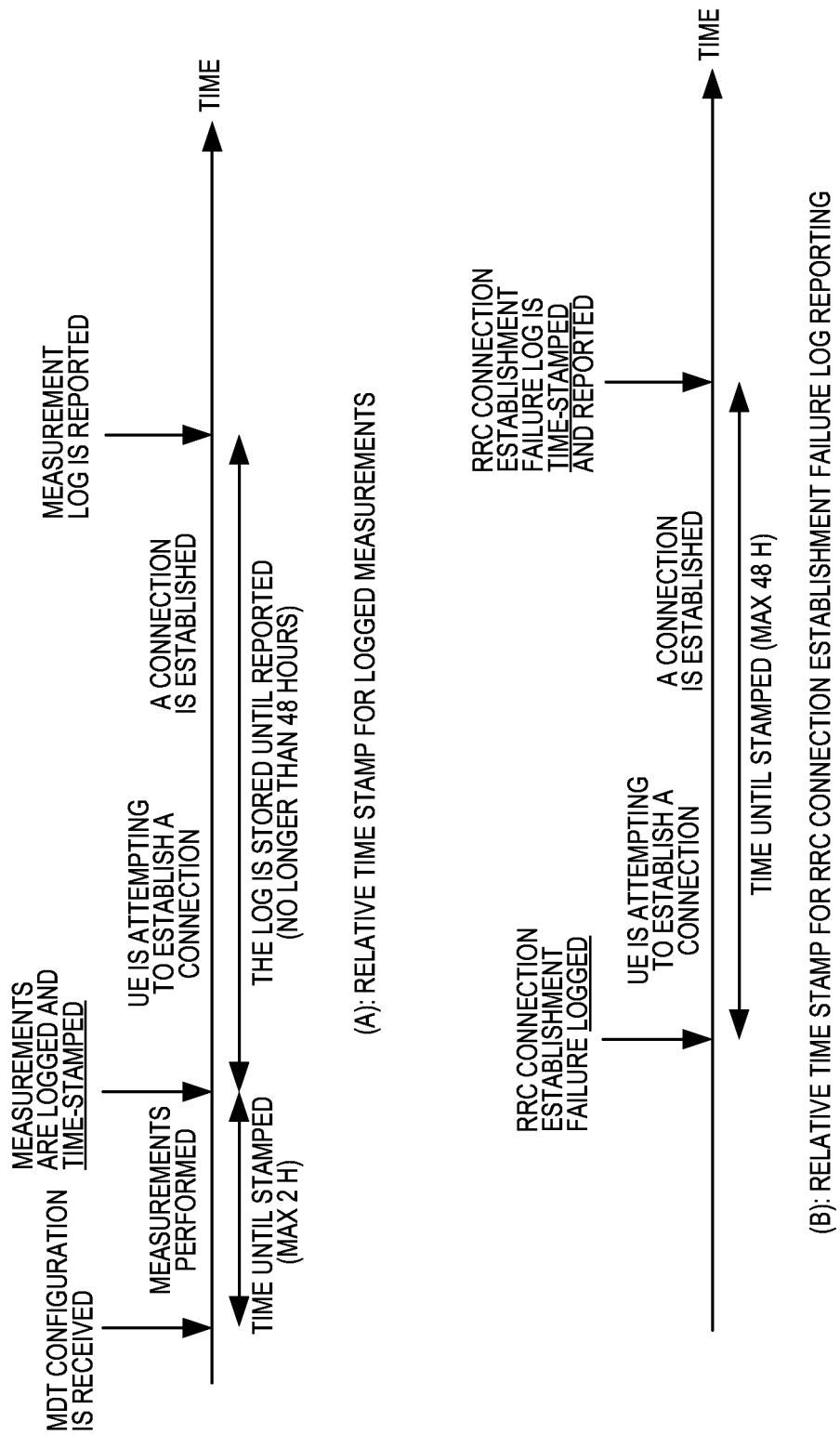
Figure 7:
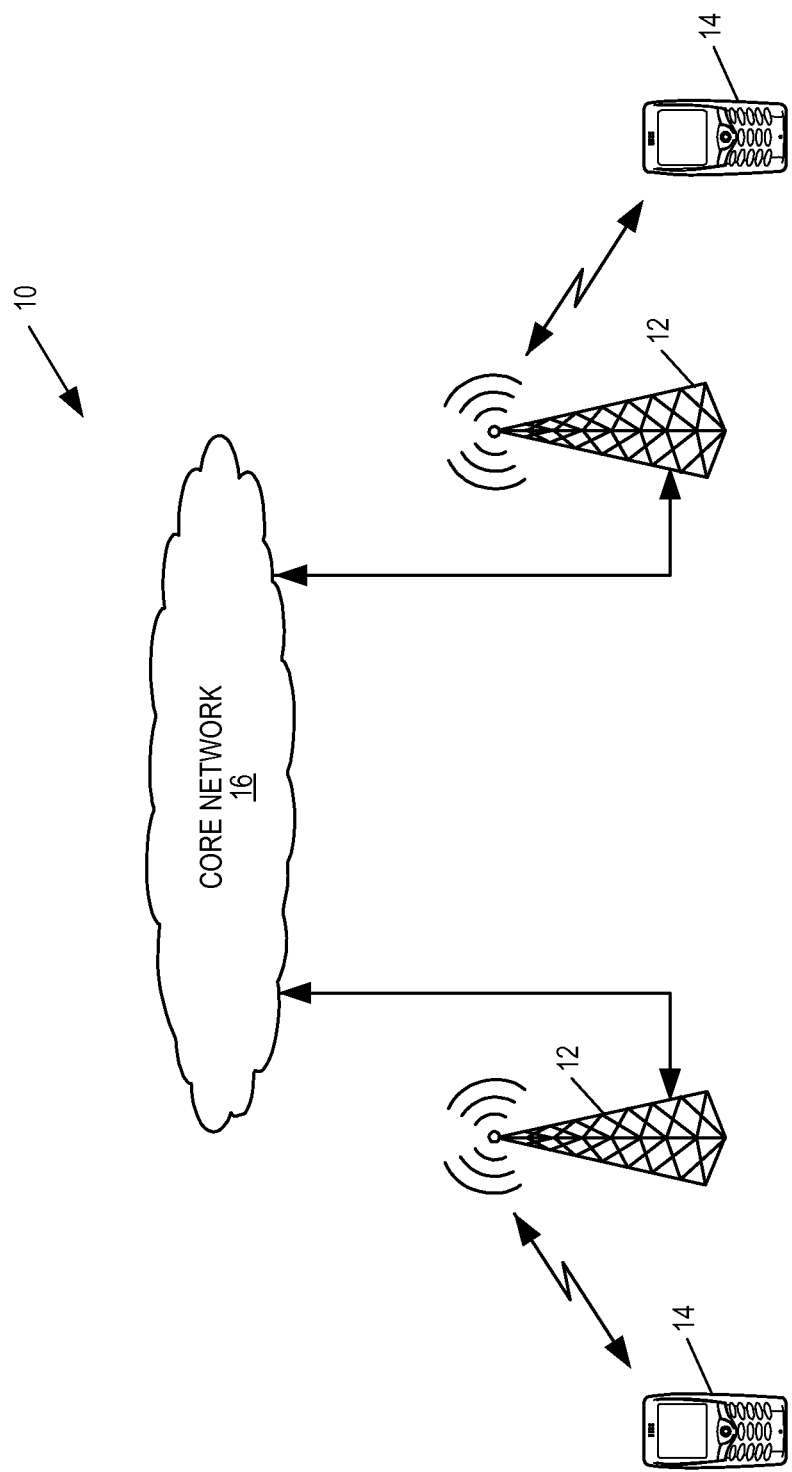
Figure 8:
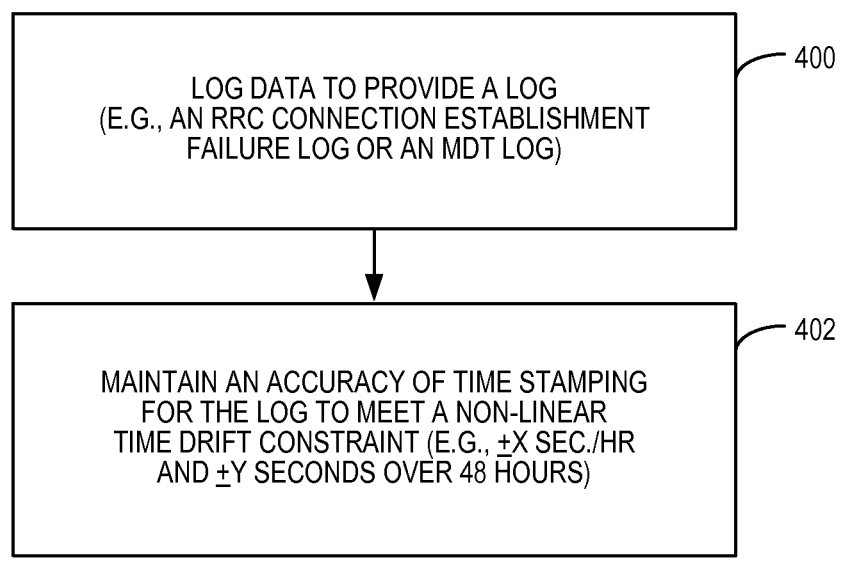
Figure 9:
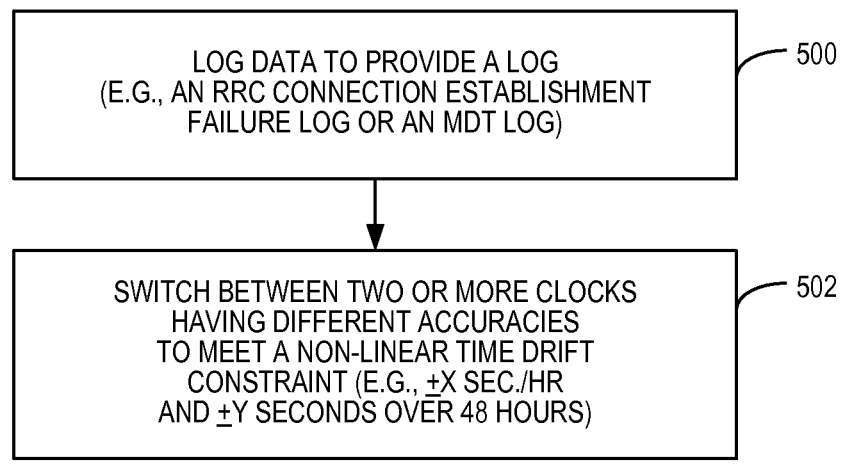
Figure 10:
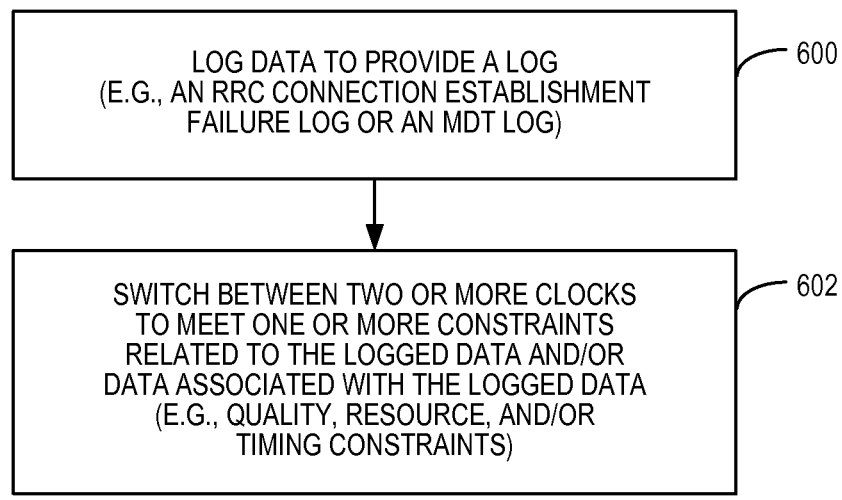
Figure 11:
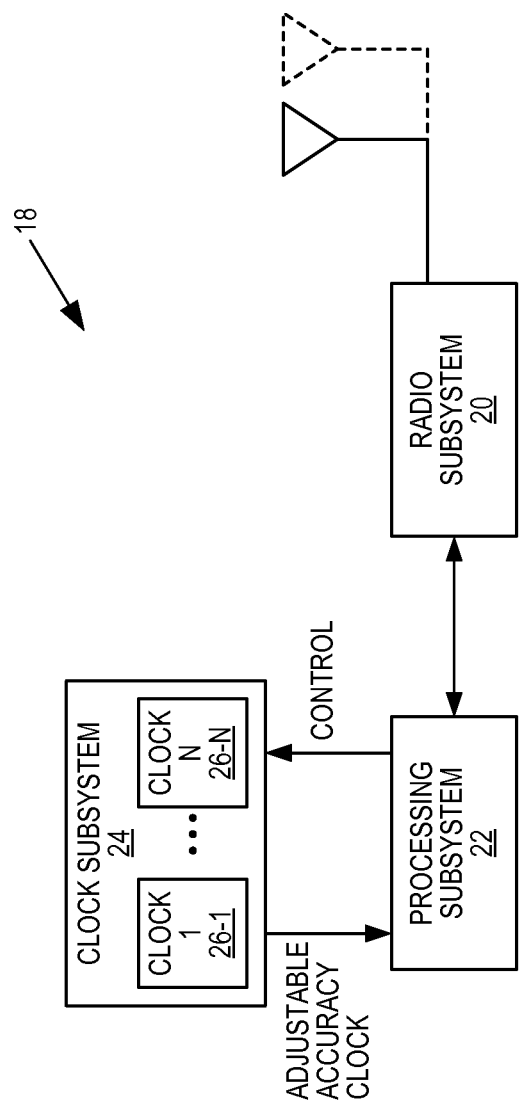
Figure 12:
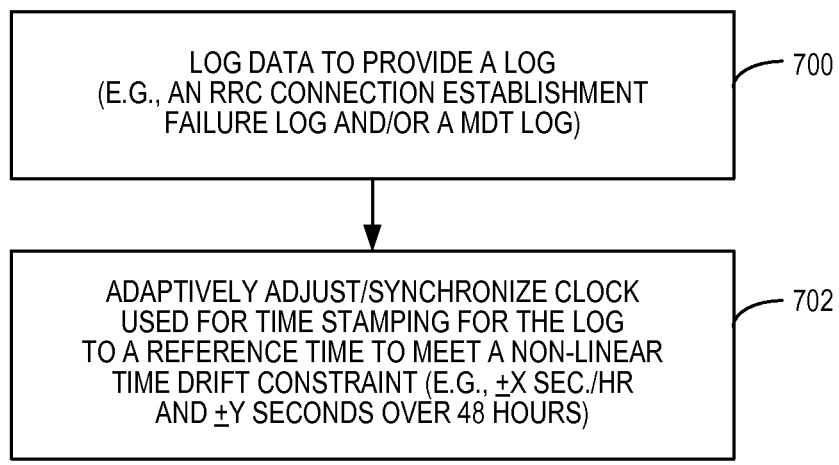
Figure 13:
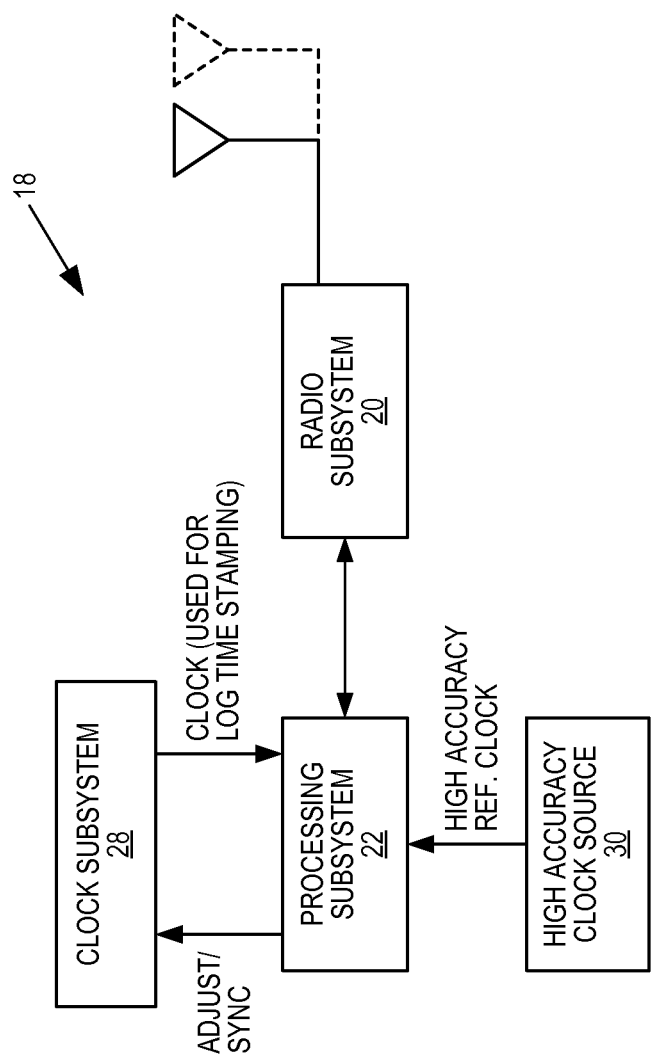
Figure 14:
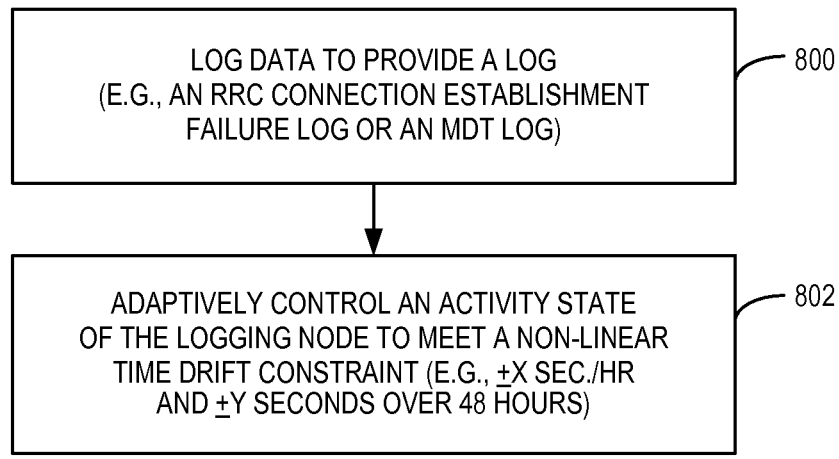
Figure 15:
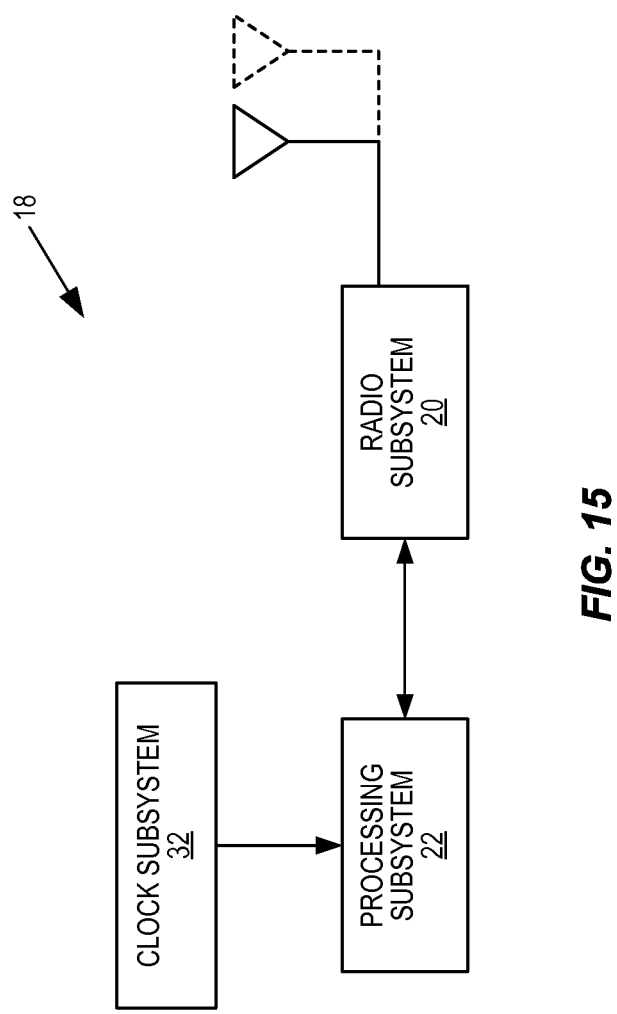

FIG. 6 schematically illustrates the difference between time stamping for an MDT measurement log and time stamping for an RRC connection establishment failure log;

FIG. 7 illustrates a cellular communications network according to one embodiment of the present disclosure;

FIG. 8 illustrates a process performed by a logging node according to one embodiment of the present disclosure;

FIG. 9 illustrates a process by which a logging node maintains an accuracy of time stamping to meet a non-linear time drift constraint by switching between two or more clocks having different accuracies according to one embodiment of the present disclosure;

FIG. 10 illustrates a process by which a logging node maintains one or more constraints by switching between two or more clocks having different accuracies according to one embodiment of the present disclosure;

FIG. 11 is a block diagram of one example of a logging node that switches between two or more clocks according to the process of either FIG. 9 or FIG. 10 according to one embodiment of the present disclosure;

FIG. 12 illustrates a process by which a logging node maintains an accuracy of time stamping to meet a non-linear time drift constraint by adaptively adjusting a clock used for time stamping based on a higher accuracy reference clock or synchronizing the clock used for time stamping to the higher accuracy reference clock according to one embodiment of the present disclosure;

FIG. 13 is a block diagram of one example of a logging node that performs the process of FIG. 12 according to another embodiment of the present disclosure;

FIG. 14 illustrates a process by which a logging node maintains an accuracy of time stamping to meet a non-linear time drift constraint by adaptively controlling an activity level of the logging node according to one embodiment of the present disclosure; and FIG. 15 is a block diagram of one example of a logging node that performs the process of FIG. 14 according to another embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to maintaining time stamping accuracy for reporting and logging in a wireless communications network. In particular, embodiments are disclosed herein for maintaining time stamping accuracy for reporting and/or logging in a cellular communications network. In some of the embodiments described herein, the cellular communications network is a Long Term Evolution (LTE) cellular communications network. However, the concepts disclosed herein are not limited to LTE and may be used in any suitable cellular communications network or, more generally, any suitable wireless communications network. For instance, the embodiments described herein may apply to any Radio Access Network (RAN) or single or multiple Radio Access Technology (RAT). Other than LTE, some other RAT examples are LTE Time Division Duplexing (TDD), LTE-Advanced, Universal Mobile Telecommunications System (UMTS), High Speed Packet Access (HSPA), Global System for Mobile Communications (GSM), Code Division Multiple Access (CDMA) 2000, WiMAX, and WiFi. The embodiments described herein also apply to single-carrier, multi-carrier, multi-RAT, and Carrier Aggregation (CA) networks.

While the concepts disclosed herein are not limited by any particular problem to be solved, before discussing embodiments of the present disclosure, a brief discussion of some examples of problems related to current Minimization of Drive Tests (MDT) logging and reporting and Radio Resource Control (RRC) connection establishment failure logging and reporting are described. While embodiments of the systems and methods disclosed herein may be used to address or overcome these problems, the present disclosure is not limited thereto. Embodiments disclosed herein may be used to address additional or alternative problems.

For some MDT logs, a time stamp at reporting is made and an accuracy requirement may be defined for the time stamp. MDT logs may be stored for up to 48 hours according to $3^{rd}$ Generation Partnership Project (3GPP) specifications or even longer in practice. During such a long storage time of an MDT log, there may be a large time drift which may degrade the accuracy of the time stamp at the time of reporting. This time drift represents an accumulated error in the clock or clocks used by the User Equipment device (UE) with respect to some absolute time or a reference time used by a network node that will be interpreting the UE's measurements. After a long storage time (e.g., 48 hours), this time drift will make the time stamp at reporting very inaccurate, and the reported information in the MDT log may be difficult to use in a correct way in the cellular communications network, which will in turn reduce the benefits of the MDT feature.

Currently, the accuracy requirement for a relative time stamp for logged MDT is ±2 seconds per hour (s/hr). However, the relative time stamp for a logged measurement is defined as the time from the moment the MDT configuration was received at the UE until the measurement was logged, and the duration of the logging can be up to a maximum of two hours. Thus, the maximum error due to time drift at the end of two hours is ±4 seconds. The situation is different for an RRC connection establishment failure log, where the relative time stamp is defined as the elapsed time between logging and reporting the log, i.e., up to 48 hours. Therefore, reusing the same accuracy requirement for RRC connection establishment failure log time stamping as that used for logged MDT would lead to an error of up to 96 seconds, which is not acceptable from the cellular communications network point of view. On the other hand, not all UEs may be capable of having a better accuracy, which may be more costly and may require a separate clock for RRC connection failure log reporting.

Systems and methods are disclosed herein that can be used to address the issues discussed above by maintaining time stamping accuracy according to a non-linear accuracy constraint. While these systems and methods may be used in any suitable type of wireless network, in the embodiments described herein, the systems and methods are used in a cellular communications network and, in particular, a UMTS or LTE/LTE-Advanced cellular communications network.

In this regard, FIG. 7 illustrates a cellular communications network 10 according to one embodiment of the present disclosure. The cellular communications network 10 is preferably a UMTS or LTE/LTE-Advanced cellular communications network. As illustrated, the cellular communications network 10 includes a RAN (e.g., a Universal Terrestrial Radio Access Network (UTRAN) or Evolved UTRAN (E-UTRAN)) that includes a number of base stations 12 that provide wireless access to a number of wireless devices 14, which may also be referred to herein as UEs. The base stations 12 are connected, directly or indirectly (e.g., through a Radio Network Controller (RNC)), to a core network 16. Note that the cellular communications network 10 may include numerous types of nodes that are not illustrated in FIG. 7 such as, for example, relays, mobile relays, Location Management Units (LMUs), Self-Optimized Network (SON) nodes, low-power or small-cell base stations (e.g., femto base stations, pico base stations, and/or home base stations), or the like.

Before continuing, a number of definitions are beneficial. As used herein, a "radio node" is characterized by its ability to transmit and/or receive radio signals and it comprises at least a transmitting or receiving antenna. A radio node may be a wireless device (i.e., a UE) or a radio network node.

The terms wireless device and UE are used interchangeably in this disclosure. As used herein, a "wireless device," or UE, is any device equipped with a radio interface and capable of at least transmitting or receiving a radio signal from another radio node. A wireless device may also be capable of receiving and demodulating a signal. Note that even some radio network nodes, e.g., a femto Base Station (BS) (which is also known as a home BS) or LMU, may also be equipped with a UE-like interface. Some examples of a wireless device that are to be understood in a general sense are a Personal Digital Assistant (PDA), a laptop, a mobile phone, a tablet device, a sensor, a fixed relay, a mobile relay, or any radio network node equipped with a UE-like interface (e.g., a small Radio BS (RBS), an Evolved Node B (eNB), a femto BS, or an LMU). Additionally, the wireless devices described herein may represent Machine Type Communication (MTC)/Machine-to-Machine (M2M) communication devices or other devices that only have limited communication capabilities. For example, the described wireless devices may represent devices, such as a wireless meter or sensor, that are capable of transmitting data but that lack or have limited ability to receive wireless transmissions. Similarly, the described wireless devices may represent devices, such as an electronic billboard, that are capable of receiving data but that lack or have limited ability to transmit wireless transmissions.

As used herein, a "radio network node" is a radio node comprised in a radio communications network. A radio network node may be capable of receiving radio signals or transmitting radio signals in one or more frequencies, and may operate in single-RAT, multi-RAT or multi-standard mode (e.g., Multi-Standard Radio (MSR)). A radio network node, including a base station (e.g., an eNB), a pico eNB or a Home eNB (HeNB), a radio access point, a Remote Radio Head (RRH), a Remote Radio Unit (RRU), a relay, a mobile relay, a transmitting-only/receiving-only radio network node, or an RNC, may or may not create its own cell. Some examples of radio network nodes not creating their own cells are beacon devices transmitting configured radio signals or measuring nodes receiving and performing measurements on certain signals (e.g., location measurement units and LMUs). A radio network node may also share a cell or the used cell Identifier (ID) with another radio node which creates its own cell. Further, a radio network node may operate in a cell sector or may be associated with a radio network node creating its own cell. More than one cell or cell sectors (commonly named in the described embodiments by a generalized term "cell" which may be understood as a cell or its logical or geographical part) may be associated with one radio network node. Further, one or more serving cells (in downlink and/or uplink) may be configured for a wireless device, e.g., in a CA system where a wireless device may have one Primary Cell (PCell) and one or more Secondary Cells (SCells). A cell may also be a virtual cell (e.g., characterized by a cell ID but does not provide a full cell-like service) associated with a transmit node. A radio network node (e.g., an eNB, an RNC, a radio access point, etc.) may be a node controlling a wireless device.

A network node may be any radio network node or core network node. Some non-limiting examples of a network node are an eNB (also a radio network node), an RNC, a positioning node, a Mobility Management Entity (MME), a Public Safety Answering Point (PSAP), a SON node, an MDT node (also interchangeably used with "Trace Collection Entity (TCE)" at least in some embodiments), a coordinating node, a gateway node (e.g., a Packet Data Network Gateway (P-GW), a Serving Gateway (S-GW), an LMU gateway, or a femto gateway), and an Operation and Management (O&M) node.

The term "coordinating node" used herein is a network and/or node, which coordinates radio resources with one or more radio nodes. Some examples of the coordinating node are a network monitoring and configuration node, an Operational Support System (OSS) node, an O&M node, an MDT node, a SON node, a positioning node, an MME node, a gateway node such as a P-GW or a S-GW network node, a femto gateway node, an LMU gateway connecting multiple LMUs, a macro node coordinating smaller radio nodes associated with the macro node, an eNB coordinating resources with other eNBs, etc.

The signaling described herein is either via direct links or logical links (e.g., via higher layer protocols and/or via one or more network and/or radio nodes). For example, signaling from a coordinating node to a UE may also pass another network node, e.g., a radio network node. The term "subframe" used in the embodiments described herein (typically related to LTE) is an example resource in the time domain, and in general it may be any predefined time instance or time period.

FIG. 8 is a flow chart that illustrates a process performed by a logging node according to one embodiment of the present disclosure. The logging node is generally any node that performs logging of data such as, for example, one of the wireless devices 14, a relay, a mobile relay, or the like. As illustrated, the logging node logs data to provide a log (step 400). The logged data is preferably logged measurements for MDT purposes such that the log is an MDT log or logged data for an RRC connection establishment failure such that the log is an RRC connection establishment failure log. However, the log may additionally or alternatively include a radio link failure log, a random access failure log, a paging channel failure log, a broadcast channel failure log, data related to failure of specific channels, and/or a radio measurement(s).

The logging node performs one or more actions to maintain an accuracy of time stamping for the log to meet a non-linear time drift constraint (step 402). In one embodiment, the non-linear time drift constraint is a constraint that the time drift of the time stamping be less than or equal to ±X s/hr and ±Y seconds over a defined number of hours (e.g., 48 hours). The value of X and Y are such that the accuracy constraint of ±Y seconds over the defined number of hours is more restrictive than the accuracy constraint ±X s/hr. Thus, the non-linear time drift constraint is referred to herein as being "non-linear" in that the accuracy constraint of the time drift is non-linear over time. In other words, the non-linear time drift constraint can be said to be a combination of a linear time drift constraint (i.e., ±X s/hr) and a total time drift constraint over a defined amount of time (e.g., ±Y seconds over the defined amount of time) that is more restrictive than the linear time drift constraint.

In one particular embodiment, the non-linear time drift constraint is a constraint that the time drift of the time stamping be less than or equal to ±0.72 s/hr and ±Y seconds over 48 hours. Further, in one embodiment, the log is either an MDT log or an RRC connection establishment failure log, and the non-linear time drift constraint is a constraint that the time drift of the time stamping be less than or equal to ±0.72 s/hr and ±Y seconds over 48 hours. Still further, in another embodiment, Y=1.73. In another embodiment, Y=10. Thus, using an RRC connection establishment failure report as an example, normally, the RRC connection establishment failure report can be reported any time up to 48 hours after the occurrence of the RRC connection establishment failure (as specified in the 3GPP standards). Using the normal time drift constraint of ±2 s/hr, the time drift of the time stamping of the RRC connection establishment failure log at the time of reporting can be up to ±96 seconds. In contrast, in the process of FIG. 8, the accuracy of time stamping is maintained to meet the non-linear time drift constraint such that, at the end of the maximum 48 hour period for reporting, the time stamping has an accuracy of at least ±Y seconds, wherein in one embodiment Y=1.73 and in another embodiment Y=10.

FIGS. 9 through 14 provide various embodiments of methods and systems for maintaining the accuracy of time stamping to meet the non-linear time drift constraint. More specifically, FIG. 9 illustrates a process by which a logging node maintains an accuracy of time stamping to meet a non-linear time drift constraint by switching between two or more clocks having different accuracies according to one embodiment of the present disclosure. As illustrated, the logging node logs data to provide a log (step 500). The logged data is preferably logged measurements for MDT purposes such that the log is an MDT log or logged data for an RRC connection establishment failure such that the log is an RRC connection establishment failure log. However, the logged data may additionally or alternatively include data logged for other purposes (e.g., data logged for a radio link failure log, data logged for a random access failure log, data logged for a paging channel failure log, data logged for a broadcast channel failure log, data related to failure of specific channels, and/or a radio measurement(s)).

The logging node switches between two or more clocks having different accuracies to meet a non-linear time drift constraint (step 502). The details of the non-linear time drift constraint are given above and, as such, are not repeated. In one embodiment, the logging node may have a first clock having a first accuracy and a second clock having a second accuracy, where the accuracy of the first clock is less, or worse, than the accuracy of the second clock. The logging node may then switch between the first and second clocks such that the non-linear time drift constraint is met. In one embodiment, the logging node initially uses the first lower accuracy clock and then switches to the second higher accuracy clock after a predefined amount of time has elapsed since, e.g., MDT configuration or detection of an RRC connection establishment failure. In a similar manner, the logging node may switch to the second higher accuracy clock if the time stamping accuracy falls below a predefined or configured threshold. The time periods or schedule for switching between the two or more clocks may be pre-configured statically in the logging node or may be adapted to environmental and operational conditions (e.g., to the current resource utilization level, activity state, current or predicted time stamping accuracy, etc.). The clock switching may also be controlled by a schedule controlling the two or more clocks.

As an example, if the non-linear time drift constraint is ±0.72 s/hr and ±10 seconds over 48 hours and if the first clock has an accuracy or time drift of ±0.72 s/hr (200 parts per million (ppm) accuracy) and the second clock has an accuracy or time drift of ±0.015 s/hr (10 ppm), the logging node could use the first clock (lower accuracy clock) for the first 13.16 hours (for a time drift of ±9.4752 seconds) and then use the second clock (high accuracy clock) for the remaining 34.84 hours (for an additional time drift of ±0.5226 seconds). This would give a total time drift of ±10 seconds for the time stamping over the maximum period of 48 hours. In another example, the logging node could switch between the first and second clocks according to some determined or predefined/configured schedule to meet the non-linear time drift constraint. For example, the logging node may switch between the first and second clocks according to any schedule where the first clock (accuracy of ±0.72 s/hr) operates 27.42% of the time over the 48 hour period and the second clock (accuracy of ±0.015 s/hr) operates 72.58% of the time over the 48 hour period.

In another embodiment, the logging node may monitor the accuracy of the time stamping over time and adaptively or dynamically switch between the two or more clocks based on the monitored accuracy. For example, the logging node may initially use a first lower accuracy clock for time stamping. However, when the accuracy of the time stamping is worse than a predefined threshold, the logging node may switch to a second higher accuracy clock until the accuracy of the clock is better than a predefined threshold or in an acceptable range. The threshold(s) (and, if applicable, the acceptable range) are predefined such that the time stamping accuracy satisfies the non-linear time drift constraint. In a similar manner, a predicted accuracy of the time stamping may be used to switch between two or more clocks in order to meet the non-linear time drift constraint.

Note that the logging node may also switch between the clocks to intentionally degrade the accuracy of the time stamping in order to, e.g., save resources, but not below a threshold. The logging node may then use a higher accuracy clock(s) to catch up with the non-linear time drift constraint by the end of the time period.

Note that while the process of FIG. 9 is used to meet the non-linear time drift constraint, the logging node may additionally or alternatively switch between two or more clocks having different accuracies (and thus resource requirements) in order to meet one or more constraints in addition to or as an alternative to a non-linear time drift constraint. In this regard, FIG. 10 illustrates a process by which the logging node switches between two or more clocks to meet, or satisfy, one or more constraints according to one embodiment of the present disclosure. As illustrated, the logging node logs data to provide a log (step 600). The logged data is preferably logged measurements for MDT purposes such that the log is an MDT log or logged data for an RRC connection establishment failure such that the log is an RRC connection establishment failure log. However, the logged data may additionally or alternatively include data logged for other purposes (e.g., data logged for a radio link failure log, data logged for a random access failure log, data logged for a paging channel failure log, data logged for a broadcast channel failure log, data related to failure of specific channels, and/or a radio measurement(s)).

The logging node switches between two or more clocks having different accuracies to meet one or more constraints (step 602). The one or more constraints may include a non-linear time drift constraint. In addition or alternatively, the one or more constraints may include one or more additional constraints such as, for example, one or more resource constraints (e.g., one or more constraints on power consumed by the logging node and/or processing resources consumed by the logging node for logging and reporting of data). More specifically, higher accuracy clocks require higher power and/or processing resources than lower accuracy clocks. As such, the logging node may adaptively switch between the two or more clocks in order to maintain a desired level of accuracy for, e.g., time stamping while also reducing or minimizing the power and/or processing resources utilized for logging and reporting. Thus, the logging node may initially use the lower or lowest accuracy clock for time stamping and then switch to a higher accuracy clock(s) only as needed to satisfy, e.g., a time stamping accuracy constraint.

FIG. 11 is a block diagram of one example of a logging node 18 that switches between two or more clocks according to the process of either FIG. 9 or FIG. 10 according to one embodiment of the present disclosure. As illustrated, the logging node 18 includes a radio subsystem 20, a processing subsystem 22, and a clock subsystem 24. The radio subsystem 20 generally includes analog and, in some embodiments, digital components for wirelessly sending and receiving messages to and from other nodes (e.g., radio network nodes and/or the wireless devices 14). The processing subsystem 22 is implemented in hardware or in a combination of hardware and software. In particular embodiments, the processing subsystem 22 may comprise, for example, one or several general-purpose or special-purpose microprocessors or other microcontrollers programmed with suitable software and/or firmware to carry out some or all of the functionality of the logging node 18 described herein. In addition or alternatively, the processing subsystem 22 may comprise various digital hardware blocks (e.g., Application Specific Integrated Circuits (ASICs), one or more off-the-shelf digital and analog hardware components, or a combination thereof) configured to carry out some or all of the functionality of the logging node 18 described herein. Additionally, in particular embodiments, the above-described functionality of the logging node 18 may be implemented, in whole or in part, by the processing subsystem 22 executing software or other instructions stored on a non-transitory computer-readable medium, such as Random Access Memory (RAM), Read Only Memory (ROM), a magnetic storage device, an optical storage device, or any other suitable type of data storage component.

The clock subsystem 24 includes a number of clocks 26-1 through 26-N (where N>1) each having a different accuracy. The processing subsystem 22 controls the clock subsystem 24 to switch between the clocks 26-1 through 26-N as described above in order to satisfy one or more constraints (e.g., a non-linear time drift constraint) related to logging and reporting of data to the cellular communications network (e.g., logging and reporting of MDT measurements and/or logging and reporting an RRC connection establishment failure).

FIG. 12 illustrates a process by which a logging node maintains an accuracy of time stamping to meet a non-linear time drift constraint by adaptively adjusting a clock used for time stamping based on a higher accuracy reference clock or synchronizing the clock used for time stamping to the higher accuracy reference clock according to one embodiment of the present disclosure. As illustrated, the logging node logs data to provide a log (step 700). The logged data is preferably logged measurements for MDT purposes such that the log is an MDT log or logged data for an RRC connection establishment failure such that the log is an RRC connection establishment failure log. However, the logged data may additionally or alternatively include data logged for other purposes (e.g., data logged for a radio link failure log, data logged for a random access failure log, data logged for a paging channel failure log, data logged for a broadcast channel failure log, data related to failure of specific channels, and/or a radio measurement(s)).

The logging node adaptively adjusts a clock used for time stamping based on a higher accuracy reference clock or synchronizes the clock used for time stamping to the higher accuracy reference clock to meet a non-linear time drift constraint (step 702). The details of the non-linear time drift constraint are given above and, as such, are not repeated. The reference clock may be provided by any internal or external source. For example, the reference clock may be provided by an external source, e.g., BS timing, Global Navigation Satellite System (GNSS) timing, or the like or by timing of an in-device external wireless system such as Wireless Local Area Network (WLAN), Bluetooth, or the like.

For example, the logging node may adjust the clock used for time stamping based on the reference clock or synchronize the clock used for time stamping with the reference clock if the logging time exceeds a predefined threshold and/or an accuracy of time stamping becomes worse than a predefined threshold. In one embodiment, the logging time is a duration of time over which data is logged starting from reception of the MDT configuration (e.g., the relative time stamp for a logged MDT measurement is defined as the time from the moment the MDT configuration was received at the logging node until the measurement was logged). In another embodiment, the logging time is a duration of time from a last logging of logged data to a current time, a predicted or future time, a reporting time for the log, or the time when the log is included in the report (e.g., the relative time stamp for RRC connection establishment failure log reporting is defined as the time elapsed from the last RRC connection establishment failure to the time when the log is included in the report). Thereafter, the logging node may continue to periodically or otherwise adjust/synchronize the clock used for time stamping to meet the non-linear time drift constraint. As another example, the logging node may adjust/synchronize the clock used for time stamping periodically or according to a predefined or a dynamically configured schedule such that the non-linear time drift constraint is satisfied. In addition to the non-linear time drift constraint, the logging node may perform adjustments/synchronization of the clock used for time stamping based on one or more additional constraints (e.g., one or more resource constraints).

FIG. 13 is a block diagram of one example of the logging node 18 that performs the process of FIG. 12 according to another embodiment of the present disclosure. In this embodiment, the logging node 18 includes the radio subsystem 20 and the processing subsystem 22, as described above. In addition, the logging node 18 includes a clock subsystem 28 that provides a clock used for time stamping for logging and reporting of logged data (e.g., logged MDT measurements and/or logged RRC connection establishment failure data). In this embodiment, the logging node 18 also includes a high accuracy clock source 30. The high accuracy clock source 30 may be, for example, a component associated with an in-device external wireless system such as WLAN, Bluetooth, or the like that is capable of providing a high accuracy reference clock. As discussed above, the logging node 18, and in this particular embodiment the processing subsystem 22, adjusts the clock provided by the clock subsystem 28 based on the reference clock or synchronizes the clock provided by the clock subsystem 28 to the reference clock to satisfy one or more constraints (e.g., the non-linear time drift constraint for time stamping).

FIG. 14 illustrates a process by which a logging node (e.g., a wireless device 14) maintains an accuracy of time stamping to meet a non-linear time drift constraint by adaptively controlling an activity level of the logging node according to one embodiment of the present disclosure. For example, there may be three activity levels each having an associated accuracy level for the clock used for time stamping. Specifically, in this example, the three activity levels have the following accuracy levels (e.g., predefined and associated with states):

Level 1 in state 1 (e.g., 200 ppm which corresponds to a time drift of 0.72 s/hr, when out of coverage), Level 2 in state 2 (e.g., 10 ppm which corresponds to a time drift of 0.036 s/hr, when in RRC_IDLE), and Level 3 in state 3 (e.g., 1 ppm which corresponds to 0.0036 s/hr, when in RRC_CONNECTED).

As illustrated, the logging node logs data to provide a log (step 800). The logged data is preferably logged measurements for MDT purposes such that the log is an MDT log or logged data for an RRC connection establishment failure such that the log is an RRC connection establishment failure log. The logging node adaptively controls the activity state of the logging node to meet a non-linear time drift constraint (step 802). The non-linear time drift constraint may be as defined above. Note that this embodiment (as well as the other embodiments described above) may also be used to meet linear time drift constraints. In one embodiment, the activity state of the logging node is adaptively controlled to ensure that the non-linear time drift constraint (or other minimum condition(s)) is met. For example, the logging node may be not allowed to go to IDLE state or may choose to not go to IDLE state if the accuracy of time stamping is too loose and may not meet the constraint(s) since the clock time drift is higher with RRC_IDLE than with RRC_CONNECTED stated. The logging node or the network node may trigger state changes using any suitable technique.

As an example, the logging node (or alternatively a network node) may know that a certain accuracy can be obtained by controlling the activity level of the logging node in a certain manner. As one specific example, it may be known that the logging node can meet a certain accuracy level provided that the logging node spends at least X hours or Y % of time in a certain activity state. As another example, it may be known that 10 ppm accuracy can be met provided that the logging node spends 80% of time corresponding to the relative time stamp in RRC_IDLE and >10% of time in RRC_CONNECTED.

FIG. 15 is a block diagram of one example of the logging node 18 that performs the process of FIG. 14 according to another embodiment of the present disclosure. In this embodiment, the logging node 18 includes the radio subsystem 20 and the processing subsystem 22, as described above. In addition, the logging node 18 includes a clock subsystem 32 that provides a clock used for time stamping for logging and reporting of logged data (e.g., logged MDT measurements and/or logged RRC connection establishment failure data). The accuracy of the clock provided by the clock subsystem 32 depends on the activity state of the logging node 18. As such, using the process of FIG. 14, the activity level of the logging node 18 is controlled by the logging node 18 or a network node in order to meet the desired constraint(s) on the accuracy of the time stamping.

The embodiments above, separately or in combination with each other, may be implemented to meet one or mode predefined constraints. Some examples of the constraint(s) are: time stamping accuracy (e.g., relative time stamp accuracy) for logged measurements in RRC_IDLE (e.g., logged MDT measurements) and time stamping accuracy (e.g., relative time stamp accuracy) for RRC connection establishment failure log reporting. The time stamping accuracy for logged measurements in RRC_IDLE may require a different time stamp accuracy than RRC connection establishment failure logging. Also, one constraint may have different accuracy levels depending on time period, e.g., as below.

Relative Time Stamp Accuracy: The relative time stamp for a logged MDT measurement is defined as the time from the moment the MDT configuration was received at the logging node until the measurement was logged. While not essential, for more information, the interested reader is directed to 3GPP TS 36.331: "Evolved Universal Terrestrial Radio Access (E-UTRA); Radio Resource Control (RRC) protocol specification," V. 11.1.0, September 2012 ("3GPP Technical Specification (TS) 36.331"), which is incorporated by reference herein in its entirety. As specified in 3GPP TS 36.331, the accuracy of the relative time stamping for MDT measurements is such that the time drift of the time stamping is not more than ±2 s/hr.

Relative Time Stamp Accuracy for RRC Connection Establishment Failure Log Reporting: As specified in 3GPP TS 36.331, relative time stamping for RRC connection establishment failure log reporting is defined as the time elapsed from the last RRC connection establishment failure to the time when the log is included in the report. The logging node shall report the RRC connection establishment failure log, while meeting the following accuracy requirement: the accuracy of the relative time stamping for RRC connection establishment failure log reporting is such that the time drift of the time stamping shall not be larger than ±0.72 s/hr and ±10 seconds over 48 hours. Note: 0.72 s/hr corresponds to 200 ppm, and 10 seconds over 48 hours corresponds to approximately 57.87 ppm over 48 hours (i.e., approximately 0.208 s/hr, which is less than 2 s/hr for the lower accuracy requirement). An accuracy of 10 ppm corresponds to 1.73 seconds over 48 hours (i.e., the total time drift is only 10 ppm over 48 hours giving 0.015 s/hr in average, which is less than 2 seconds for a short timer which can only be up to 2 hours).

Using the embodiments described above, in one example, the logging node may implement two different clocks and switch between the clocks to control the accuracy to meet the tightest accuracy requirement (57.87 ppm in one embodiment and 10 ppm in another embodiment). In another example, the logging node may adaptively adjust its clock or timer synchronization with a reference clock depending on, e.g., the current time since the last log (e.g., last failure log), a predicted reporting time (e.g., failure reporting time), or a predicted logging time (e.g., predicted failure or predicted measurement logging and time stamping).

The following acronyms are used throughout this disclosure.

3GPP 3$^{rd}$ Generation Partnership Project
ACK Acknowledgement
ASIC Application Specific Integrated Circuit
BS Base Station
BSC Base Station Controller
CA Carrier Aggregation
CDMA Code Division Multiple Access
DCCH Dedicated Control Channel
DL Downlink
Ec Energy per Chip
E-DCH Enhanced Dedicated Channel
EM Element Manager
eNB Evolved Node B
E-RUCCH Enhanced Dedicated Channel Random Access Uplink Control Channel
E-UTRA Evolved Universal Terrestrial Radio Access
E-UTRAN Evolved Universal Terrestrial Radio Access Network
FDD Frequency Division Duplexing
FPACH Fast Physical Access Channel
GERAN Global System for Mobile Communications Edge Radio Access Network GNSS Global Navigation Satellite System
HeNB Home Evolved Node B
HSPA High Speed Packet Access
ID Identifier
IE Information Element
IMEI International Mobile Equipment Identity
IMSI International Mobile Subscriber Identity
IP Internet Protocol
LA Local Area
LTE Long Term Evolution
LMU Location Measurement Unit
M2M Machine-to-Machine
MDT Minimization of Drive Tests
MME Mobility Management Entity
ms Millisecond
MSR Multi-Standard Radio
MTC Machine Type Communication
NB Node B
No Noise Spectral Density
O&M Operation and Management
OSS Operational Support System
P-CCPCH Primary Common Control Physical Channel
PCell Primary Cell
PCI Physical Cell Identity
PDA Personal Digital Assistant
P-GW Packet Data Network Gateway
PLMN Public Land Mobile Network
Pn Pseudo noise
ppm Parts Per Million
PSAP Public Safety Answering Point
RA Registered Area
RAM Random Access Memory
RAN Radio Access Network
RAT Radio Access Technology
RBS Radio Base Station
RNC Radio Network Controller
ROM Read Only Memory
RPLMN Registered Public Land Mobile Network
RRC Radio Resource Control
RRH Remote Radio Head
RRU Remote Radio Unit
RSCP Received Signal Code Power
RSRP Reference Signal Received Power
RSRQ Reference Signal Received Quality
Rxlev Received Signal Level
SCell Secondary Cell
S-GW Serving Gateway
s/hr Seconds per Hour
SON Self-Optimized Network
TA Tracking Area
TCE Trace Collection Entity
TDD Time Division Duplexing
TR Technical Report
TS Technical Specification
UE User Equipment
UMTS Universal Mobile Telecommunications System
UTRA Universal Terrestrial Radio Access
UTRAN Universal Terrestrial Radio Access Network Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device in a cellular communications network, comprising: logging, by the wireless device, data to provide a log; and maintaining by the wireless device, an accuracy of time stamping for the log to meet a non-linear time drift constraint having a linear time drift constraint and a total maximum time drift over a defined amount of time, where the total maximum time drift over the defined amount of time is less than an amount of time drift in the time stamping that would result from the linear time drift constraint over the defined amount of time, wherein maintaining the accuracy of the time stamping for the log to meet the non-linear time drift constraint comprises:
   switching between two or more clocks having different accuracies such that the non-linear time drift constraint is met;
   providing the time stamping for the log with a first clock having a first accuracy; and
   switching to a second clock having a second accuracy that is greater than the first accuracy when a logging time exceeds a threshold.

2. The method of claim 1 wherein the log is one or more of a Radio Resource Control, RRC, connection establishment failure log, a radio link failure log, a random access failure log, a paging channel failure log, a broadcast channel failure log, data related to failure of specific channels, and a radio measurement.

3. The method of claim 1 wherein the log is a Minimization of Drive Test, MDT, log.

4. The method of claim 1 wherein the log is a Minimization of Drive Test, MDT, log including a reported time since failure for a radio link failure.

5. The method of claim 1 wherein the log is a Minimization of Drive Test, MDT, log including a reported time since a corresponding failure.

6. The method of claim 1 wherein the non-linear time drift constraint is a constraint that a time drift of the time stamping for the log is not larger than ±X seconds per hour and ±Y seconds over a defined amount of time.

7. The method of claim 1 wherein the non-linear time drift constraint is a constraint that a time drift of the time stamping for the log is not larger than ±X seconds per hour and ±Y seconds over 48 hours.

8. The method of claim 7 wherein X is 0.72.

9. The method of claim 7 wherein Y is 1.73.

10. The method of claim 7 wherein the log is a Radio Resource Control, RRC, connection establishment failure log.

11. The method of claim 7 wherein the log is a Minimization of Drive Test, MDT, log including a reported time since failure for a corresponding failure.

12. The method of claim 1 wherein the log is a Minimization of Drive Time, MDT, log, and the logging time is a duration of time over which data is logged starting from reception of an MDT configuration for the MDT log.

13. The method of claim 1 wherein the logging time is a duration of time elapsed from a last logging of logged data to one of a group consisting of: a current time, a predicted future time, a reporting time for the log, and the time when the log is included in the report.

14. The method of claim 1 wherein maintaining the accuracy of the time stamping for the log to meet the non-linear time drift constraint comprises switching from the first clock having a first accuracy to the second clock having a second accuracy that is greater than the first accuracy when the accuracy of the time stamping for the log becomes worse than a first threshold.

15. The method of claim 14 wherein maintaining the accuracy of the time stamping for the log to meet the non-linear time drift constraint further comprises: switching back to the first clock when the accuracy of the time stamping for the log improves to a second threshold that is greater than the first threshold.

16. The method of claim 1 wherein the time stamping for the log is based on a clock having an accuracy that is a function of an activity state of the wireless device, and maintaining the accuracy of the time stamping for the log to meet the non-linear time drift constraint comprises adaptively controlling an activity state of the wireless device to meet the non-linear time drift constant.

17. The method of claim 1 wherein the time stamping for the log is one or more of:
   a relative time stamp for a logged measurement as a time from a moment a Minimization of Drive Time, MDT, configuration was received at the wireless device until the logged measurement was logged;
   a relative time stamp as a time elapsed between a moment logged data is logged and a moment the logged data is reported;
   a relative time stamp as a time elapsed between a moment logged data is logged and a moment the logged data is included in a report to be reported; and
   a relative time stamp for a Radio Resource Control, RRC, connection establishment failure as a time elapsed from a last RRC connection establishment failure to a time when the log is included in a report.

18. The method of claim 1 wherein at least a portion of the log is reported to a network node.

19. A wireless device configured to operate in a cellular communications network, comprising:
   a radio subsystem; and
   a processing subsystem associated with the radio subsystem and configured to: log data to provide a log; and maintain an accuracy of time stamping for the log to meet a non-linear time drift constraint having a linear time drift constraint and a total maximum time drift over a defined amount of time, where the total maximum time drift over the defined amount of time is less than an amount of time drift in the time stamping that would result from the linear time drift constraint over the defined amount of time, wherein in order to maintain the accuracy of the time stamping for the log to meet the non-linear time drift constraint the processing subsystem is further configured to:
   switch between two or more clocks having different accuracies such that the non-linear time drift constraint is met;
   provide the time stamping for the log with a first clock having a first accuracy; and
   switch to a second clock having a second accuracy that is greater than the first accuracy when a logging time exceeds a threshold.

20. The wireless device of claim 19 wherein the non-linear time drift constraint is a constraint that a time drift of the time stamping for the log is not larger than ±X seconds per hour and ±Y seconds over 48 hours.

21. The wireless device of claim 20 wherein X is 0.72.

22. The wireless device of claim 21 wherein Y is 1.73.

23. The wireless device of claim 20 wherein the log is one or more of a Radio Resource Control, RRC, connection establishment failure log, a radio link failure log, a random access failure log, a paging channel failure log, a broadcast channel failure log, data related to failure of specific channels, and a radio measurement.

24. The wireless device of claim 20 wherein the log is a Minimization of Drive Test, MDT, log.

* * * * *